United States Patent [19]

Scholl et al.

[11] Patent Number: 4,578,799

[45] Date of Patent: Mar. 25, 1986

[54] METHOD AND APPARATUS FOR RECOVERING DATA AND CLOCK INFORMATION FROM A SELF-CLOCKING DATA STREAM

[75] Inventors: Frederick W. Scholl, Riverdale; Michael H. Coden, New York, both of N.Y.

[73] Assignee: Codenoll Technology Corporation, Yonkers, N.Y.

[21] Appl. No.: 539,128

[22] Filed: Oct. 5, 1983

[51] Int. Cl.$^4$ .................. H03D 3/22; H04L 27/22; H04L 7/02; G11B 5/09
[52] U.S. Cl. ..................... 375/87; 375/110; 360/42
[58] Field of Search .............. 375/110, 8, 7; 360/42; 307/269

[56] References Cited

U.S. PATENT DOCUMENTS

| | | | |
|---|---|---|---|
| 3,727,202 | 4/1973 | Fort | 360/42 |
| 3,967,061 | 6/1976 | Dobias | 375/110 |
| 3,979,746 | 9/1976 | Jarrett | 375/87 |
| 4,189,784 | 2/1980 | Mendenhall | 307/269 |
| 4,468,791 | 8/1984 | Masek | 375/87 |

Primary Examiner—Douglas W. Olms
Assistant Examiner—Wellington Chin
Attorney, Agent, or Firm—Pennie & Edmonds

[57] ABSTRACT

A method and apparatus are disclosed for recovering data and clock information from high speed self-clocking data streams at rates of up to approximately 50 Mbps. The self-clocking data stream has a predetermined bit period and two voltage levels with negative-going and positive-going voltage level transitions. A pulse is generated for each voltage level transition in the coded stream. This pulse is applied to a non-retriggerable one-shot that produces an output pulse that is approximately the duration of one-half of a bit period. After the output pulse of the one-shot terminates, the one-shot is non-retriggerable for a period of time less than the duration of one-half of a bit period. The output pulse from the one-shot provides clock information derived from the coded bit stream. This clock information is provided to the clock input of a bistable storage device and the coded bit stream is applied to a data input to the storage device. In response to the clock input, the bistable storage device decodes the coded bit stream to provide decoded data information at an output.

22 Claims, 11 Drawing Figures

METHOD AND APPARATUS FOR RECOVERING DATA AND CLOCK INFORMATION FROM A SELF-CLOCKING DATA STREAM

BACKGROUND OF THE INVENTION

The present invention relates to a decoder which recovers clock and data information from a bit stream.

It is frequently desirable in data processing communication networks to provide a self-clocking data stream in which clocking information is transmitted as an integral part of the data stream. Such data streams are often described as Manchester or bi-phase coded bit streams. In such systems, there is at least one voltage level transition during the period of time allocated to the transmission of each bit; and an additional voltage level transition may also be used during each such bit period to represent binary data. In one such system, a positive-going voltage transition at the start of a bit period represents a 1-bit and a negative-going voltage transition represents a 0-bit. In such a system, if two successive bits are the same, there must be a setup transition in the opposite direction so that the direction of the transition at the start of each bit period is the same. As is known, the transitions of interest can take place at other times than the beginning of the bit period; and the bit value assigned to a specific direction of transition is a matter of choice. In another system, a 0-bit is represented by a bit period having one voltage transition and a 1-bit by a a bit period having two voltage transitions.

Apparatus for recovering data and clock information from a self-clocking data stream is known in the art, being described, for example, in U.S. Pat. No. 3,967,061 which is incorporated herein by reference. The apparatus described in the '061 patent, however, is designed to operate at only 56 Kilobits per second (Kbps), which is relatively slow compared with present day communication standards. For example, in the Ethernet system, data transmission rates are 10 Megabits per second (Mbps); and rates up to 50 Mbps are desirable in some applications.

SUMMARY OF THE INVENTION

We have derived a method and apparatus for recovering data and clock information from high speed self-clocking data streams at rates of up to approximately 50 Mbps. The self-clocking data stream has a predetermined bit period and two voltage levels with negative-going and positive-going voltage level transitions. In accordance with the invention, a pulse is generated for each voltage level transition in the coded stream. This pulse is applied to a non-retriggerable one-shot that produces an output pulse that is approximately the duration of one-half of a bit period. After the output pulse of the one-shot terminates, the one-shot is non-retriggerable for a period of time less than the duration of one-half of a bit period.

The output pulse from the one-shot provides clock information derived from the coded bit stream. This clock information is provided to the clock input of a bistable storage device and the coded bit stream is applied to a data input to the storage device. In response to the clock input, the bistable storage device decodes the coded bit stream to provide the decoded data information at an output.

BRIEF DESCRIPTION OF THE DRAWING

These and other objects, features and advantages of the invention will be more readily apparent from the following description of a preferred embodiment of the invention in which.

DESCRIPTION OF PREFERRED EMBODIMENT

Figure 1:
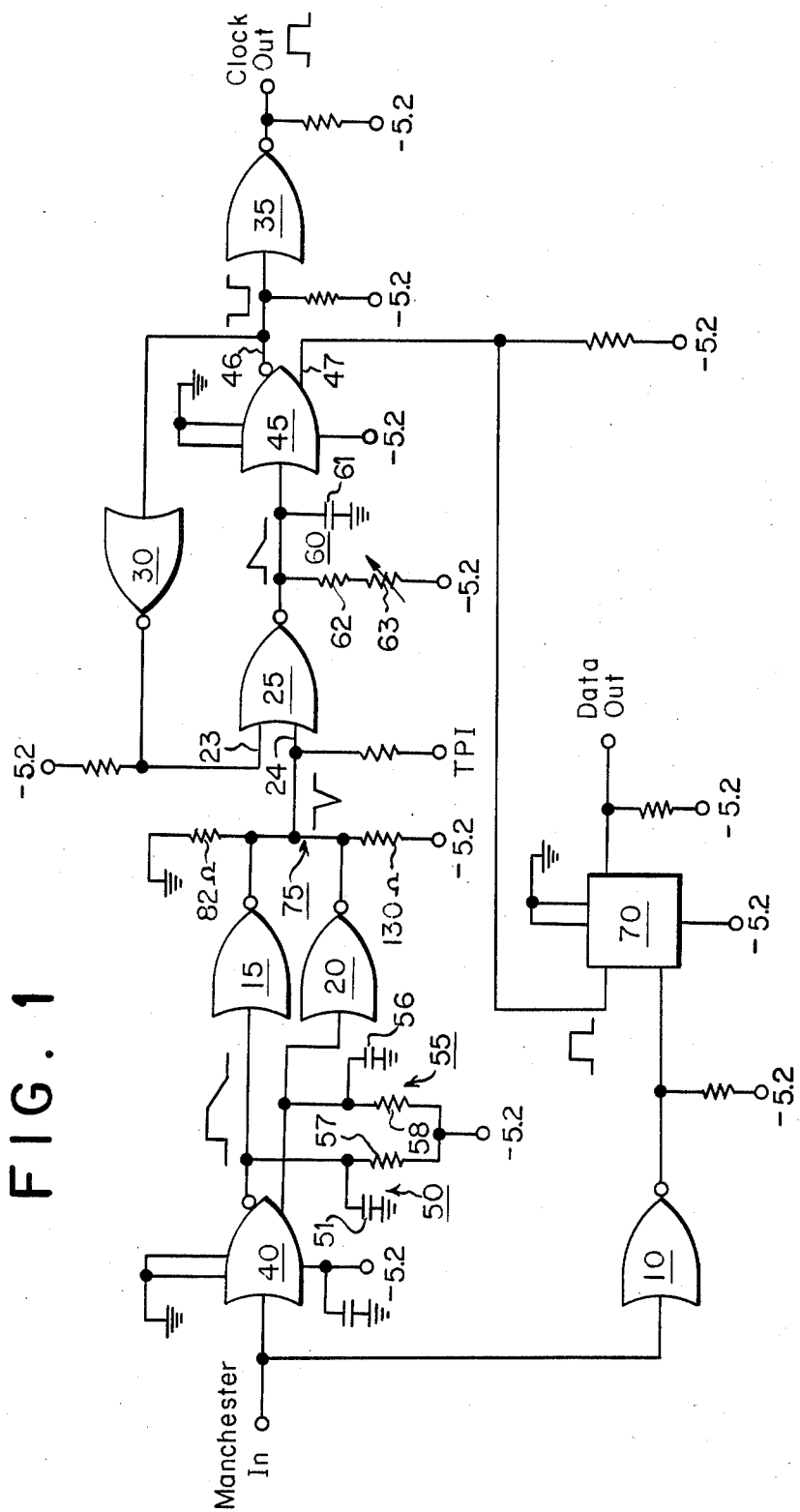
FIG. 1 is a schematic illustration of a preferred embodiment of a decoder of the present invention.

As shown in FIG. 1, the decoder of the present invention comprises NOR gates 10, 15, 20, 25, 30 and 35, OR gates 40 and 45 with inverting and non-inverting outputs, RC networks 50, 55 and 60, a flip-flop 70 and a biasing circuit 75. Illustratively, gates 10, 30 and 45 may be implemented in one 10102 emitter coupled logic integrated circuit (IC); and gates 15, 20, 25 and 40 may be implemented in a second such IC. Flip-flop 70 illustratively may be a 10131 emitter coupled logic D-type flip-flop. RC networks 50, 55 may each comprise a capacitor 51, 56 having a capacitance of 10 picoFarads and a resistor 58, 57 having a resistance of 1.5 kiloOhms so that their RC time constants are 15 nsec. RC network 60 illustratively comprises a capacitor 61 having a capacitance of 33 picoFarads, a first resistor 62 having a resistance of 390 Ohms and a second resistor 63 with a variable resistance from 0 to 10 kiloOhms.

Gates 15, 20 and 40, RC networks 50 and 55, and biasing circuit 75 are connected to produce a single pulse of negative polarity for each voltage level transition in the Manchester encoded signal applied to an input to gate 40. Gates 25, 30 and 45 and RC network 60 form a non-retriggerable one-shot. Without triggering, the output of gates 25 and 30 and a non-inverting output 46 of gate 45 are low; and an inverting output 47 of gate 45 is high. As shown, the output of gate 30 is an input 23 to gate 25. When input 23 is low, the one-shot can be triggered by a low signal on a second input 24 to gate 25. When input 23 is high, however, the one-shot cannot be triggered.

Figure 2:
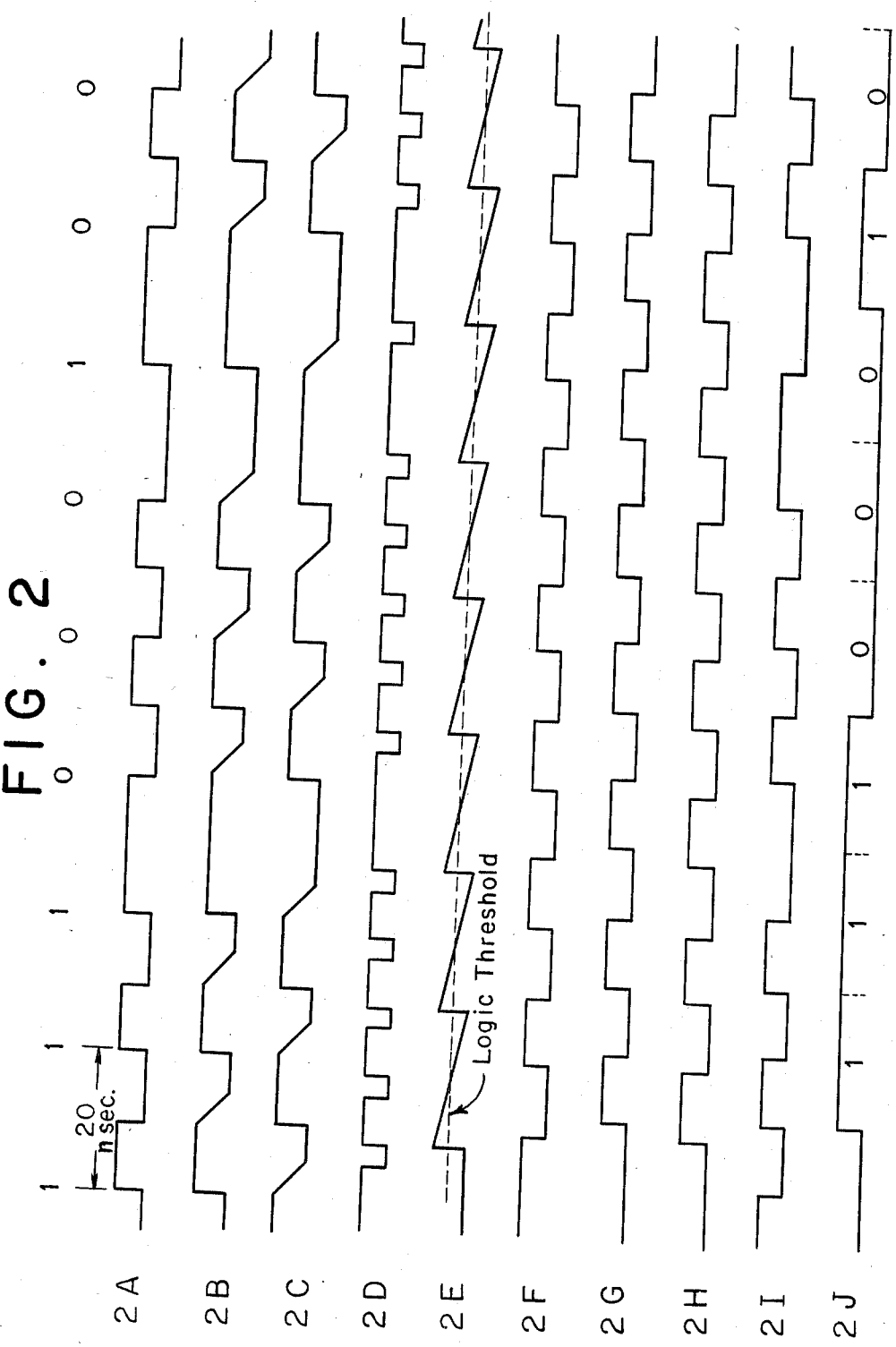
FIGS. 2A–2J are graphical representations of signal waveforms useful in understanding the invention.

If a positive-going leading edge of a bit period is used to represent a 1-bit and a negative-going leading edge a 0-bit, the sequence of bits at the top of FIGS. 2A–2J is represented in a Manchester code by the bit stream shown in FIG. 2A. As shown, each bit period is 20 nanoseconds (nsec.) in duration; and any setup transition occurs halfway through the bit period. To decode the clock and data information in such a bit stream, the bit stream is applied to the input of NOR gate 10 and OR gate 40. The stream is inverted by NOR gate 10 and delayed by a propagation delay of about 2.5 nsec.; and the resulting bit stream which is shown in FIG. 2I is applied to the data input to flip-flop 70. As will be detailed below, the inverted output of flip-flop 70 is a data signal shown in FIG. 2J representative of the data information encoded in the Manchester bit stream.

OR gate 40 generates complementary edges for each transition in the Manchester encoded bit stream that is applied to its input. In the positive direction these edges have transitions that are illustratively 2 nsec. in duration due to current sources in OR gate 40; and in the negative direction these edges have transitions that are approximately 5 nsec. in duration due to the RC decay of RC networks 50 or 55. Such edges are shown in FIGS. 2B and 2C for the illustrative bit stream of FIG. 2A. The complementary edges are applied to NOR gates 15 and 20 where they are inverted and the outputs of NOR gates 15 and 20 are combined by wiring in a biasing circuit 75 to produce negative pulses illustrated in FIG. 2D having a duration of approximately 3 nsec. As will be apparent, the wired output of NOR gates 15 and 20 constitutes an OR gate.

Each transition in the Manchester encoded bit stream received by the decoder causes a negative pulse at input 24 to gate 25. If input 23 to gate 25 is low, this negative pulse rapidly drives the output of gate 25 high as shown in FIG. 2E; and after a propagation delay of about 2.5 nsec., the inverting output of gate 45 goes low as shown in FIG. 2F. The signal from the inverting output is fed back through NOR gate 30 to input 23 to NOR gate 25. As a result, after an inversion and a propagation delay of about 2.5 nsec. at gate 30, the signal at input 23 goes high as shown in FIG. 2G; and the one-shot cannot be retriggered while this input is high. Because of the propagation delays in gates 45 and 30, the signal at input 23 remains high for about 5 nsec. after the one-shot returns to the low state; and during this time a low signal on input 24 cannot retrigger the one-shot.

The inverting output of gate 45 is also connected to NOR gate 35 where the signal at this output is inverted and delayed by approximately 2.5 nsec. before being supplied as a clock signal to the apparatus in which the decoder is used. In addition to representing the output of gate 30, FIG. 2G also represents the clock signal output from gate 35.

As shown in FIG. 2E, the high signal at the output of gate 25 ramps down slowly as determined by the time constant in the RC network formed by capacitor 61 and resistors 62 and 63. The one-shot stays in the high state as long as the signal across capacitor 61 is above the logic threshold of gate 45; and the variable resistance of resistor 63 advantageously is adjusted so that the one-shot pulse width as observed in the clock signal output from gate 35 is one-half of a bit period corresponding to the point where the setup transition can occur.

Since the high state of the one-shot is about one-half of a bit period and the one-shot cannot be retriggered until at least 5 nsec. after its high state has ended, the one-shot will always trigger on the same transition of each bit frame once the one-shot is synchronized. In addition, if the initial voltage level transition takes place at the position in a bit period where there is always a voltage transition, only a single voltage transition is required to achieve synchronization because this is enough to begin generation of the clock signal at the correct time relative to the bit period.

The non-inverting output of gate 45 is connected to a clock input terminal of flip-flop 70 where the positive-going edge of the signal at the clock input causes the flip-flop to latch the signal then present at its data input. For the Manchester coded bit stream of FIG. 2A, the signal at the clock input to flip-flop 70 is shown in FIG. 2H. After a propagation delay of about 2.5 nsec., flip-flop 70 provides at its output the inversion of the signal present at its data input at the time it receives the positive-going edge of the clock signal. This data output signal is shown in FIG. 2J and its derivation from the signal waveforms of FIGS. 2H and 2I will be apparent in view of the foregoing description.

As will be apparent to those skilled in the art, numerous modifications may be made in the above described circuit. Alternative circuits may be employed for generating a pulse for each voltage level transition in the coded stream, for providing a non-retriggerable one-shot, or for providing a bistable storage means such as flip-flop 70. The relative timing between signals as shown in FIGS. 2A-2J is preferred for the case where the second voltage transition takes place approximately halfway through the bit period. Variations in this timing are, however, possible. For example, the 5 nsec. delay during which the one-shot cannot be retriggered could be larger if the bit period were longer than 20 nsec. Such an increase in delay could be provided by inserting additional OR gates or NOR gates in the feedback path between gate 45 and gate 25. The delay could also be made shorter by eliminating gate 30 and providing feedback from the non-inverting terminal of gate 45. In general, however, the delay should be long enough to ensure the blanking of any second voltage transition in the bit period and short enough that it does not blank the voltage transition that begins the next bit period. Thus, the delay should be less than one-half of a bit period with allowances for tolerances in the timing of the voltage transitions.

The relative timing between the clock signal applied to the clock input of flip-flop 70 and the coded data stream applied to the data input of this flip-flop is also variable. The timing difference between the two signals should not exceed one-half of a bit period and indeed should be slightly less than this to allow for variations in the timing of any voltage transition that might occur halfway through the bit period. If desired, additional delay can be introduced into the coded bit stream by using additional OR or NOR gates.

The relative timing between the signals shown in FIGS. 2A-2J also depends on the timing of the second voltage transition in a bit period. Where this transition does not occur midway through the bit period, modification of some of the timing signals may be desirable. In particular, the slope of the ramp signal should be modified so that the duration of the output pulse from the one-shot is approximately the same time interval between the first and second voltage transitions in a bit period. With such a change, modifications may also be desirable in the timing delay in the feedback signal from gate 45 to gate 25 so that the delay is less than the difference between the duration of the bit period and the duration of the output pulse from the one-shot or in the relative timing between the clock and data signals applied to flip-flop 70 so that the delay is less than the time interval between the first and second voltage transition. Such modifications will be apparent to those skilled in the art in light of the foregoing description.

While the invention has been described for the case where a positive-going voltage transition at the leading edge of a bit period represents a 1-bit and a negative-going transition represents a 0-bit, it may also be practiced using other conventions, such as the representation of data by a voltage transition at the mid-point or trailing edge of a bit period. The invention may also be practiced using other bi-phase coding schemes, such as one where one voltage transition per bit period is used to represent a 0-bit and two voltage transitions represent a 1-bit. For this type of coding scheme, the clock information may be derived using the apparatus of FIG. 1. The data information is derived by using appropriate means to monitor both halves of the bit period and to produce a signal representative of a 0-bit if both halves are the same, and a signal representative of a 1-bit if both halves are different. Illustratively, such means can be provided by applying the data stream from gate 10 in parallel to two flip-flops, one of which is triggered on the positive-going edge of the clock pulse from gate 45 and the other of which is triggered on the negative-going edge. The output of the first flip-flop to be triggered should be delayed by half a bit period and then compared by an exclusive OR gate with the output of the other flip-flop. The output of the exclusive OR gate is the decoded data information present in the bi-phase coded bit stream.

What is claimed is:

1. In a data transmission system using self-clocking bi-phase coded bit streams, said bit streams having a predetermined bit period and two voltage levels with negative-going and positive-going voltage level transitions occurring in the stream to indicate clock information and data information, at least a first such voltage level transition and possibly a second voltage level transition occurring in each bit period, apparatus for recovering said information comprising:
   means for generating from each voltage level transition in the coded bit stream, a pulse having a first polarity,
   a non-retriggerable one-shot to which is applied the pulse of first polarity, said one-shot producing an output pulse having a duration that is approximately the time interval between said first and second voltage transitions and being non-retriggerable after said pulse terminates for a period of time less than the difference between the duration of a bit period and the duration of said output pulse, said output pulse providing clock information derived from the coded bit stream, and
   bistable storage means having a clock input to which clock information from an output of the one-shot is applied and a data input to which the coded bit stream is applied, said clock information being delayed by less than said time interval relative to any delay experienced by the coded bit stream, said bistable storage means providing at an output thereof data information decoded from the coded bit stream.

2. The apparatus of claim 1 wherein the generating means comprises:

3. The apparatus of claim 1 wherein the generating means comprises:
   a first logic gate having a non-inverted output and an inverted output and
   first and second means for differentiating signals from said non-inverted output and said inverted output.

4. The apparatus of claim 3 wherein the combining means comprises:
   a second logic gate to which is applied the differentiated signal from said non-inverted output,
   a third logic gate to which is applied the differentiated signal from said inverted output, and
   means for wiring together outputs from the second and third logic gates to form a logical OR.

5. The apparatus of claim 3 wherein the logic gates or OR gates.

6. The apparatus of claim 3 wherein the logic gates are OR gates implemented in emitter coupled logic integrated circuits.

7. In a data transmission system using self-clocking bi-phase coded bit streams, said bit streams having predetermined bit period and two voltage levels with negative-going and positive-going voltage level transitions occurring in the steam to indicate clock information and data information, at least a first such voltage level transition and possibly a second voltage level transition occuring in each bit period, apparatus for recovering said information comprising:
   means for generating from each voltage level transition in the coded bit stream, a pluse having a first polarity,
   a non-retriggerably one-shot to which is applied the pulse of first polarity, siad one-shot producing an output pulse having a duration that is approximately the time interval between said first and second voltage transitions and being non-retriggerable after said pulse terminates for a period of time less than the difference between the duration of a bit period and the duration of said output pulse, said output pulse providing clock information derived from the coded bit stream, wherein said one-shot comprises:
   a first logic gate having at least two inputs, a first of which is connected to said generating means and received said pulse having a first polarity,
   means connected to an output of said first logic gate for generating a ramp signal whose magnitude decreases gradually from a peak value,
   a second logic gate connected to said ramp signal generating means for generating said output pulse while the magnitude of said ramp signal exceeds a threshold logic value, and
   means for feeding said output pulse back to a second input of the first logic gate to inhibit said gate so that the one-shot cannot be retriggered while said output pulse is present at said second input to the first logic gate, and
   bistable storage means having a clock input to which clock information from an output of the one-shot is applied and a data input to which the coded bit stream is applied, said clock information being delayed by less than said time interval relative to any delay experienced by the coded bit stream, said bistable storage means providing at an output thereof data information decoded from the coded bit stream.

8. The apparatus of claim 7 wherein the ramp signal generating means further comprises means for varying the rate at which the magnitude of the ramp signal decreases, whereby the duration of the output pulse is varied.

9. The apparatus of claim 7 wherein the ramp signal generating means is an RC network in which a voltage level is stored in a capacitor that is gradually discharged through a resistor.

10. The apparatus of claim 9 wherein the resistance of said resistor can be varied to vary the rate at which the magnitude of the ramp signal decreases, whereby the duration of the output pulse is varied.

11. The apparatus of claim 7 wherein the means for feeding back the output pulse comprises a delay means.

12. The apparatus of claim 7 wherein the first and second logic gates and the means for feeding back the output pulse are OR gates.

13. The apparatus of claim 7 wherein the first and second logic gates and the means for feeding back the output pulse are OR gates implemented in emitter coupled logic integrated circuits.

14. The apparatus of claim 1 wherein the bit period is at least 20 nanoseconds, the clock information applied to the clock input of the bistable storage means is delayed by approximately 10 nanoseconds relative to the coded bit stream received at the generating means and the coded bit stream applied to the data input of the bistable storage means is delayed by approximately 2.5 nanoseconds.

15. The apparatus of claim 1 wherein the time interval between said first and second voltage transitions is approximately one-half the bit period.

16. In a data transmission system using self-clocking bi-phase coded bit streams, said bit streams having a predetermined bit period and two voltage levels with negative-going and positive-going voltage level transitions occurring in the stream to indicate clock information and data information, at least a first such voltage level transition and possibly a second voltage transition occurring in each bit period, a method for recovering said information comprising the steps of:
  applying the coded bit stream to a data input to a bistable storage means,
  generating from each voltage level transition in the coded bit stream, a pulse having a first polarity,
  applying said pulse to a non-retriggerable one-shot to produce an output pulse having a duration that is approximately the time interval between said first and second voltage transitions, said output pulse providing clock information derived from the coded bit stream,
  inhibiting said one-shot so that it cannot be retriggered after said pulse terminates for a period of time less than the difference between the duration of a bit period and the duration of said output pulse, and
  applying said clock information to a clock input of said bistable storage means to clock said data stream into said bistable storage means, said clock information being delayed by less than said time interval relative to any delay experienced by the coded bit stream, said bistable storage means providing at an output thereof data information decoded from the coded bit stream.

17. The method of claim 16 wherein the generating step comprises the steps of:
  generating complementary edges from each voltage level transition in the coded bit stream and
  combining the complementary edges to produce a pulse having a first polarity.

18. In a data transmission system using self-clocking bi-phase coded bit streams, said bit streams having a predetermined bit period and two voltage levels with negative-going and positive-going voltage level transitions occuring in the stream to indicate clock information and data information, at least a first such voltage level transition and possibly a second voltage transition occurring in each bit period, a method for recovering said information comprising the steps of:
  applying the coded bit stream to a data input to a bistable storage means,
  generating from each voltage level transition in the coded bit stream, a pulse having a first polarity,
  applying said pulse to a non-retriggerably one-shot to produce an output pulse having a duration that is approximately the time interval between said first and second voltage transitions, said output pulse providing clock information derived from the coded bit stream, wherein said one-shot comprises:
    a first logic gate having at least two inputs, a first of which is connected to said generating means and receives said pulse having a first polarity,
    means connected to an output of said first logic gate for generating a ramp signal whose magnitude decreases gradually from a peak value, and
    a second logic gate connected to said ramp signal generating means for generating said output pulse while the magnitude of said ramp signal exceeds a threshold logic value,
  inhibiting said one-shot so that it cannot be retriggered after said pulse terminates for a period of time less than the difference between the duration of a bit period and the duration of said output pulse, said step of inhibiting the one-shot comprising the step of feeding said output pulse back to a second input of the first logic to inhibit said gate so that the one-shot cannot be retriggered while said output pulse is present at said second input to the first logic gate, and
  applying said clock information to a clock input of said bistable storage means to clock said data stream into said bistable storage means, said clock information being delayed by less than said time interval relative to any delay experienced by the coded bit stream, said bistable storage means providing at an output thereof data information decoded from the coded bit stream.

19. The method of claim 16 wherein the bit period is at least 20 nanoseconds, the clock information applied to the clock input of the bistable storage means is delayed by approximately 10 nanoseconds relative to the coded bit stream received at the generating means and the coded bit stream applied to the data input of the bistable storage means is delayed by approximately 2.5 nanoseconds.

20. The method of claim 16 wherein the time interval between said first and second voltage transitions is approximately one-half the bit period.

21. The method of claim 18 wherein the generating step comprises the steps of:
  generating complementary edges from each voltage level transition in the coded bit stream and
  combining the complementary edges to produce a pulse having a first polarity.

22. The method of claim 18 wherein the bit period is at least 20 nanoseconds, the clock information applied to the clock input of the bistable means in delayed by approximately 10 nanoseconds relative to the coded bit stream received at the generating means and the coded bit stream applied to the data input of the bistable storage means is delayed by approximately 2.5 nanoseconds.

* * * * *